US008856747B2

(12) United States Patent
Gerginov et al.

(10) Patent No.: US 8,856,747 B2
(45) Date of Patent: Oct. 7, 2014

(54) ENTERPRISE JAVABEANS EXPLORER

(75) Inventors: Georgi Gerginov, Sofia (BG); Stefan Kovachev, Pernik (BG)

(73) Assignee: SAP AG, Walldorf (DE)

( * ) Notice: Subject to any disclaimer, the term of this patent is extended or adjusted under 35 U.S.C. 154(b) by 933 days.

(21) Appl. No.: 12/637,609

(22) Filed: Dec. 14, 2009

(65) Prior Publication Data

US 2011/0145794 A1 Jun. 16, 2011

(51) Int. Cl.
*G06F 9/44* (2006.01)
*G06F 11/36* (2006.01)
*G06F 11/32* (2006.01)
*G06F 9/445* (2006.01)

(52) U.S. Cl.
CPC .......... *G06F 11/3696* (2013.01); *G06F 11/323* (2013.01); *G06F 8/20* (2013.01); *G06F 8/60* (2013.01)
USPC ....................................................... 717/125

(58) Field of Classification Search
CPC ............... G06F 8/20; G06F 8/30; G06F 8/60; G06F 11/30
USPC .................. 717/100–103, 104–105, 124–125
See application file for complete search history.

(56) References Cited

U.S. PATENT DOCUMENTS 7,203,697 B2 * 4/2007 Chang et al. .................. 707/102

OTHER PUBLICATIONS

Sun One Application Server 7, "Developing Session Beans and Web Applications", 2002, in Sun ONE Studio 4 Enterprise Edition for Java with Application Server 7 Tutorial, retrieved from http://docs.oracle.com/cd/E19644-01/817-7809/s4_chp3.html, 49 pages.*
Gallus et al., "Oracle® Application Development Framework Tutorial (10.1.3.1.0)" , 2006, Oracle Corporation, chapters 1-11, 167 pages.*
"Class Java.lang.Object", Aug. 18, 1995, http://www.geom.uiuc.edu/~daeron/docs/apidocs/java.lang.Object.html, 4 pages.*
Michael Havey, "E-State: An Enterprise State Machine", 2008, retrieved from http://michaelhavey.ulitzer.com/node/43809, 7 pages.*

* cited by examiner

*Primary Examiner* — Ted T Vo
(74) *Attorney, Agent, or Firm* — Schwegman Lundberg & Woessner, P.A.

(57) ABSTRACT

A system and method to display an application server resource landscape in a hierarchical view and invoke an Enterprise JavaBeans business method with a complex object as an argument. In one embodiment, the hierarchical view permits user input to initialize attribute values for simple and complex arguments. A graphical user interface presents invoked business method execution results.

20 Claims, 15 Drawing Sheets

Input parameters

- SchoolClass [ DEFAULT CONSTRUCTOR ]
  - StudArray [ MultipleAddressStudent[] ]
    - MultipleAddressStudent [ DEFAULT CONSTRUCTOR ]
      - Fname [ String ]
      - Lname [ String ] = NULL
      - OtherAddresses [ Collection<Address> ]
        - Address [ DEFAULT CONSTRUCTOR ] = NULL

*FIG. 10*

ENTERPRISE JAVABEANS EXPLORER

TECHNICAL FIELD

Various embodiments relate generally to the field of development and test tools, and in particular, but not by way of limitation, to tools providing hierarchical browsing of resources deployed on an application server and functionality to invoke Enterprise JavaBeans business methods with simple and complex object arguments.

BACKGROUND

Software engineers designing applications for application servers rely on robust tools for development and testing. Sophisticated software design demand tools that permit a high level of interactivity with deployed Enterprise JavaBeans and resources, including, but not limited to, the ability to view resources on an application server, to execute business methods with simple and complex argument objects and to display the execution result.

Publicly available developer and test tools provide disparate functionality. Some programs provide the ability to view application server resources in a hierarchical fashion, but only among a subset of resources and object types. Tools that provide functionality to invoke business methods do not enable the invocation of business methods that take complex objects in as input parameters.

BRIEF DESCRIPTION OF THE FIGURES

Some embodiments are illustrated by way of example and not limitation in the figures of the accompanying drawings in which:

FIG. 10 is a user interface screenshot, showing an example user interface into which a user can provide input to initialize business methods arguments.

DETAILED DESCRIPTION

The description that follows includes illustrative systems, methods, techniques, instruction sequences or program code, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. As used herein, the term "or" may be construed in an inclusive or exclusive sense.

Although various example embodiments discussed below focus on administration of Java-based servers and related environments, the embodiments are given merely for clarity in disclosure. Thus, the technologies described herein may be deployed in any type of computing environment, based on an architecture-neutral-language, including various system architectures.

Disclosed herein are various embodiments of a development and test tool that provides a hierarchical view of an application server resource landscape, instantiates a simple or complex object as an argument for a business method, provides functionality to invoke the business method with the instantiated simple or complex object arguments and displays an execution result of the invoked business method.

The example development and test tool, which is herein conveniently labeled as an Enterprise JavaBeans explorer, assists in software development on an application server. Today's application servers may consist of several thousand applications and technical resources. The Enterprise JavaBeans explorer displays an application server resource landscape. This provides a user with a graphical representation of the resources deployed on the application server and visually represents a development environment, enabling quick and efficient software design and engineering. Additionally, the Enterprise JavaBeans explorer presents a detailed view of the simple or complex objects used as input parameters to a displayed business method. In an example embodiment, the detailed display of simple and complex object argument attributes also permits the user to initialize the object attributes with custom values. Further, a user may execute the business method from the hierarchical view using the initialized simple or complex object arguments and view the execution result. Thus, the example Enterprise JavaBeans explorer includes two processes: hierarchical display of server resource landscape data and the invocation of business methods with complex and simple arguments.

Hierarchical Display of Application Server Landscape

Figure 1:
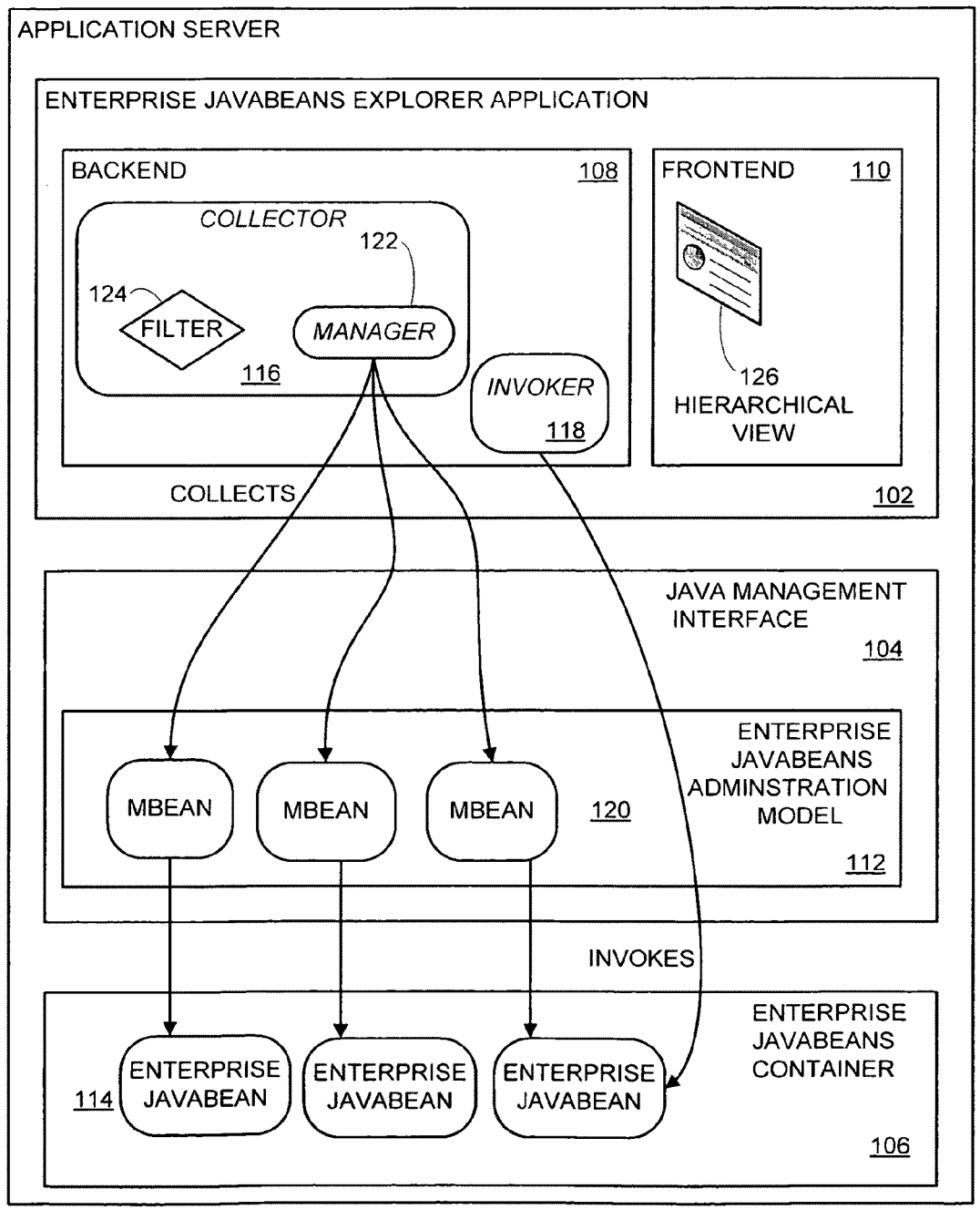
FIG. 1 is a block diagram of an application server and an Enterprise JavaBeans explorer application, according to an example embodiment.

The Enterprise JavaBeans explorer collects application server resource landscape data for display in a hierarchical view. FIG. 1 is a block diagram of an application server 100 and an Enterprise JavaBeans explorer application 102, according to an example embodiment.

The application server 100 contains an Enterprise JavaBeans explorer application 102, a Java management interface 104 and an Enterprise JavaBeans container 106. In an example embodiment, the Enterprise JavaBeans explorer application 102 is implemented using Enterprise JavaBeans technology and is one of potentially multiple applications deployed on the application server 100. The Enterprise JavaBeans explorer application 102 comprises of a business layer backend 108 and a presentation layer frontend 110. The backend 108 contains business logic to gather and collect data provided to the frontend 110, extract information necessary for business method invocation, invoke business methods, control the data flow between the backend 108 and frontend 110 and implement a common model interface (described further in FIG. 5). Moreover, in an example embodiment, the backend 108 contains logic, such as a method, class, Enterprise JavaBean or other business logic, herein known as a collector 116, responsible for collecting the application server resource landscape provided to the frontend 110 for presentation in the hierarchical view 126. In another example embodiment, the backend 108 contains an invoker module, such as a method, class, Enterprise JavaBean or other business logic, herein known as an invoker 118, responsible for the invocation of business methods and the creation of business method arguments. The invoker 118 accesses an Enterprise JavaBean 114 to invoke the business method.

Java application servers deploying a Java Management Extensions API have a Java management interface 104 that comprises an enterprise JavaBeans administration model 112. An enterprise JavaBeans administration model 112 contains information about all objects deployed on an application server by hosting managed beans, also known as MBeans 120. MBeans 120 are an information object representing a resource of the application server 100. MBeans 120 can be queried for information about application server resources, such as the Enterprise JavaBeans 114 hosted within the Enterprise JavaBeans container 106. MBeans 120 and the enterprise JavaBeans administration model 112 are accessed through the Java management interface 104. An Enterprise JavaBeans container 106 is a runtime environment which provides standard common services to run time components.

In an example embodiment, the collector 116 collects application server resource landscape data through a single management logic module that accesses the Java management interface 104, such as a method, class, Enterprise JavaBean or other business logic, herein known as a manager 122. The manager 122 builds the application server resource landscape by accessing methods exposed by the Java management interface 104 to gather data from the MBeans 120 stored in the enterprise JavaBeans administration model 112.

The collector 116 may additionally load a filter 124 to reduce the scope of the manager 122 query to the MBeans 120 and/or to filter query results from the MBeans 120. For example, the manager 122 may determine to query only for interfaces or only for interfaces with the string "Seller" in the name by passing select arguments to the methods exposed by the Java management interface 104. Moreover, the manager 122 may determine to filter the returned body of results from a query to the Java management interface 104. According to an example embodiment, an Enterprise JavaBean explorer application 102 may operate without a persistency layer and information about deployed application server resources are queried dynamically, on runtime and upon a refresh request.

The frontend 110 presents the hierarchical view 126 which represents the application server resource landscape. In an example embodiment, the frontend 110 utilizes a Web Dynpro framework to implement a model-view-controller design paradigm to display information from the backend 108. In this design paradigm, each component of the Web Dynpro application has a component controller which determines how to render a view by analyzing and accessing its context. In an example embodiment, only the explorer view's context is updated to simplify communication between the backend 108 and frontend 110. Interaction is simplified between the backend 108 and frontend 110 because all relevant communication between the two is consolidated in the common model interface (described later in FIG. 5), which serves as a controller context that the presentation layer frontend 110 and the explorer view controller can interpret and from which a resulting display in the hierarchical view 126 can be produced. Thus, when backend 108 logic updates the common model interface (described later in FIG. 5), it affects changes in the hierarchical view 126.

Figure 2:
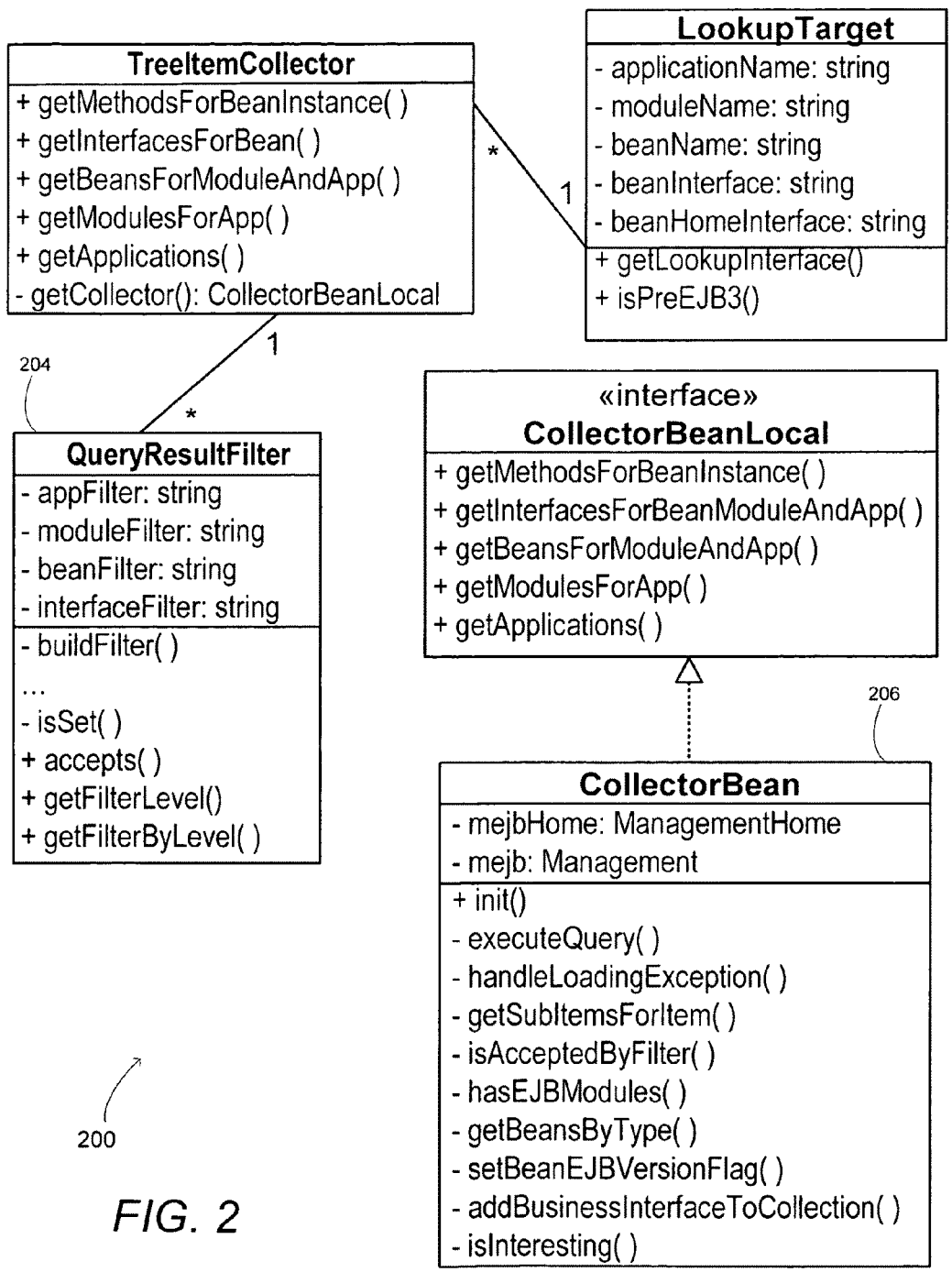
FIG. 2 is a Unified Modeling Language class diagram, including a CollectorBean and a TreeItem object.
Figure 2:
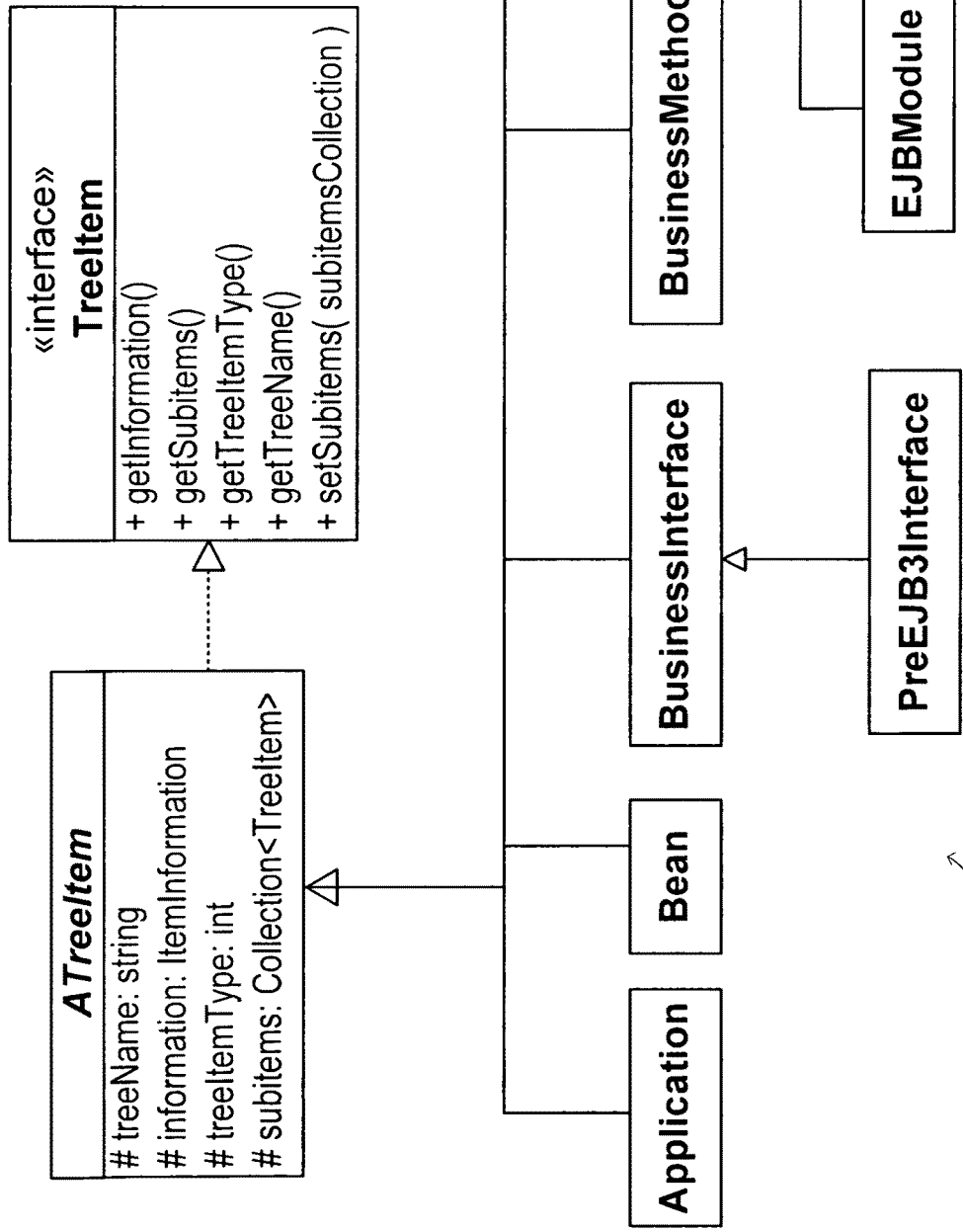

FIG. 2 is a Unified Modeling Language (UML) class diagram 200 including a CollectorBean 206 and ATreeItem object 202. The CollectorBean 206 is an example embodiment of the collector 116 and the manager 122 and contains methods to query for data, such as executeQuery( ) the data queried for comprising interfaces, beans, modules, methods and applications, and methods to filter results, such as is AcceptedByFilter( ) and getBeansByType( ). In an example embodiment, application server resource data collected by the collector 116 from the MBeans 120 is stored in a structure of ATreeItem objects 202. The ATreeItem object 202 represents a tree structure to store and preserve the hierarchical structure of the resources on the application server. In an example embodiment, the ATreeItem object 202 contains a collection of applications, beans, business methods, interfaces, Enterprise JavaBean modules, web modules and other collections. The ATreeItem object 202 contains data which populates the hierarchical view 126. A QueryResultFilter object 204 is an example embodiment of the filter 124, and possesses methods to filter applications, modules, beans and interfaces by name and other attributes.

Figure 3:
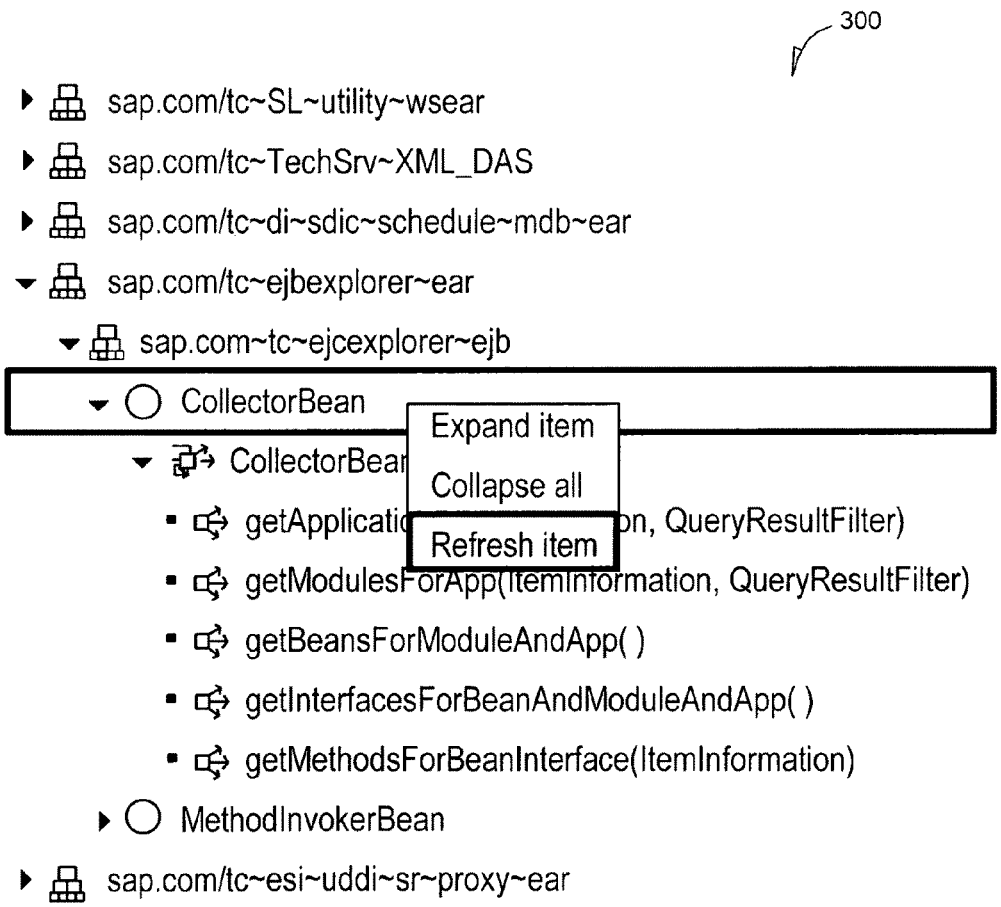
FIG. 3 is an example hierarchical view.

FIG. 3 is an example hierarchical view 300 of an application server resource landscape, according to an example embodiment. After the collector 116 queries the MBeans 120, the application server resource landscape is provided to the frontend 110 for display in the hierarchical view 126. In one embodiment, the hierarchical view 300 of the application server resource landscape contains collapsible levels including vendor, application, module, bean, interface and business method levels. Unique icons may differentiate each level and type of resource. Moreover, the hierarchical view 300 may execute commands specific to each level, as exemplified by the "expand all, collapse all and refresh item" commands. Expansion of a level in the hierarchy may trigger the collector 116 to execute a new query for additional application server resource data.

Figure 4A:
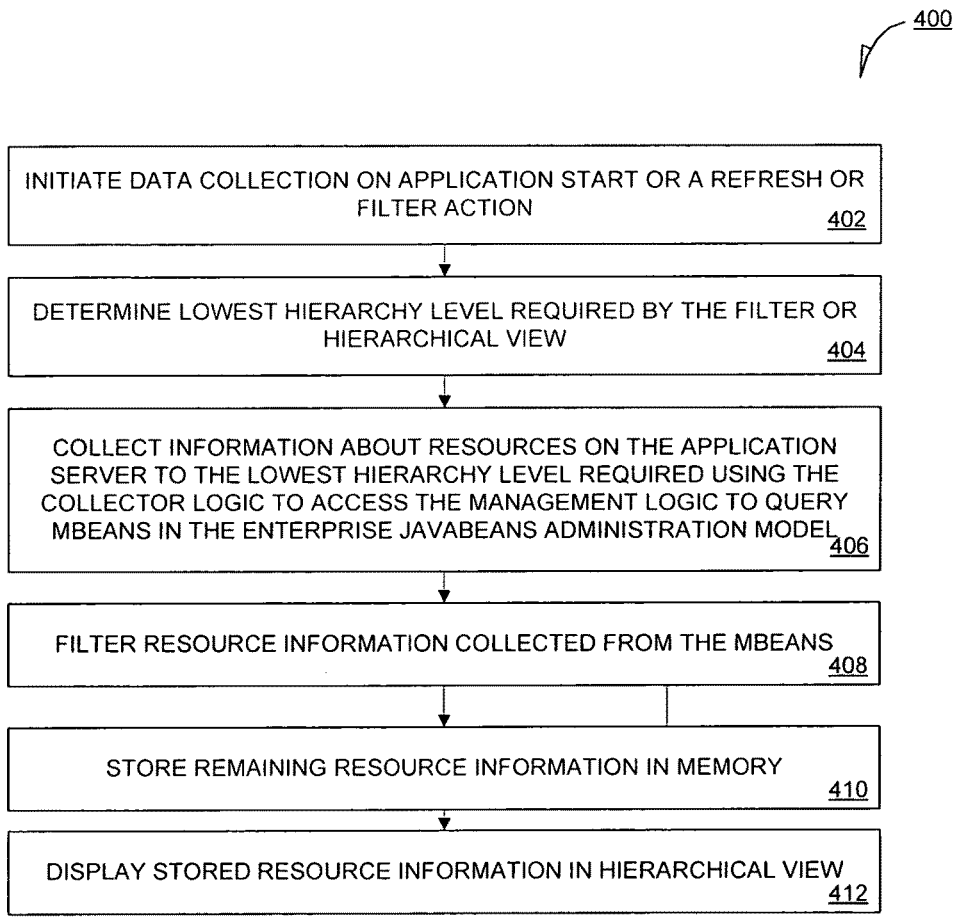
FIGS. 4A and 4B are flowcharts illustrating a process of gathering the application server landscape data, according to an example embodiment.

FIG. 4A is a flowchart illustrating a process 400 of collecting the application server landscape data, according to an example embodiment. At operation 402, an application start (or a refresh or filter action) triggers collection logic initialization. In an example embodiment, the Enterprise JavaBeans explorer application 102 does not possess a persistency layer to save data for retrieval at a later date, so collection of the application server landscape data occurs whenever new data is displayed or requested by a refresh action. Since a tremendous amount of potential application server resource landscape data exists, the application, at operation 404, analyzes the lowest level of the hierarchy displayed or required by the context of a refresh request. In an example embodiment, the Enterprise JavaBeans explorer application 102 dynamically collects only the application server resource landscape data currently required by the hierarchical view 126. For example, if the hierarchical view 126 is expanded only to the application level, upon the start of the Enterprise JavaBeans explorer application 102 or a refresh action, only application data need be gathered. Moreover, if a filter action searches for particular a bean deployed on the application server 100, no collection of data beyond the bean level is necessary. If a refresh is applied only to the context of a particular application and the hierarchical view 126 extends to the business method level, then all levels may be queried, but only for the particular refreshed application.

After a trigger event to initialize the data collection logic and the determination of the lowest hierarchy level required, the Enterprise JavaBeans explorer application 102, at operation 406, collects application server resource landscape data up to the lowest hierarchy level required. In an example embodiment, collector logic, such as the collector 116, utilizes management logic, such as the manager 122, to query the MBeans 120 stored in the Enterprise JavaBeans administration model 112 for information relating to the resources on the application server. MBeans 120 are information objects representing resources on the application server and therefore the scope of the information retrieval extends to all resources deployed on the application server. As an example, the collector 116 may possess logic to query MBeans 120 for information relating to a method, interface, bean, module or application. In addition, the manager 122 may determine to query only for interfaces or only for interfaces with the string "Seller" in the name by passing select arguments to the methods exposed by the Java management interface 104.

Upon collection of the application server resource landscape data, business logic applies any potential filters, such as the QueryResultFilter object 204, to the body of collected data, at operation 408. The filter 124 may operate by matching a pattern, such as those described by Boolean operators, wildcards, string matching, regular expressions or other forms of pattern or search expression. In an example embodiment, any filter's 124 operation may also be limited to a particular level, for example matching a string to only interface names or only in the context of a particular application. Similarly, a filter's 124 operation may also be limited to a particular branch of the hierarchy, such as within the context of a particular application. Filters 124 of the types described may also be combined, for example filtering for an application name and module name.

At operation 410, the resulting application server resource landscape data from the collection and filtering is stored in the memory of the Enterprise JavaBeans explorer application 102. In an example embodiment, the data is stored in a tree structure of ATreeItem objects 202. The ATreeItem object 202 preservers the hierarchical structure of the application server resource landscape data and may be converted to a hierarchical view 126. The ATreeItem object 202 is a collection of items, including objects representing applications, beans, interfaces, business methods, EJB modules, web modules, and other collections.

At operation 412, application server resource landscape data, which may be stored in the ATreeItem 202, is displayed to the user in the hierarchical view 126. Enterprise JavaBean explorer business logic passes the application server resource landscape data from the backend 108 to the frontend 110. In an example embodiment, the hierarchical view 126 display includes collapsible levels, improving readability yet maintaining full functionality. The hierarchical view 126 may include other visual enhancements, such as utilizing unique icons for each particular hierarchy level and textual representation of the location of the hierarchy.

Figure 4B:
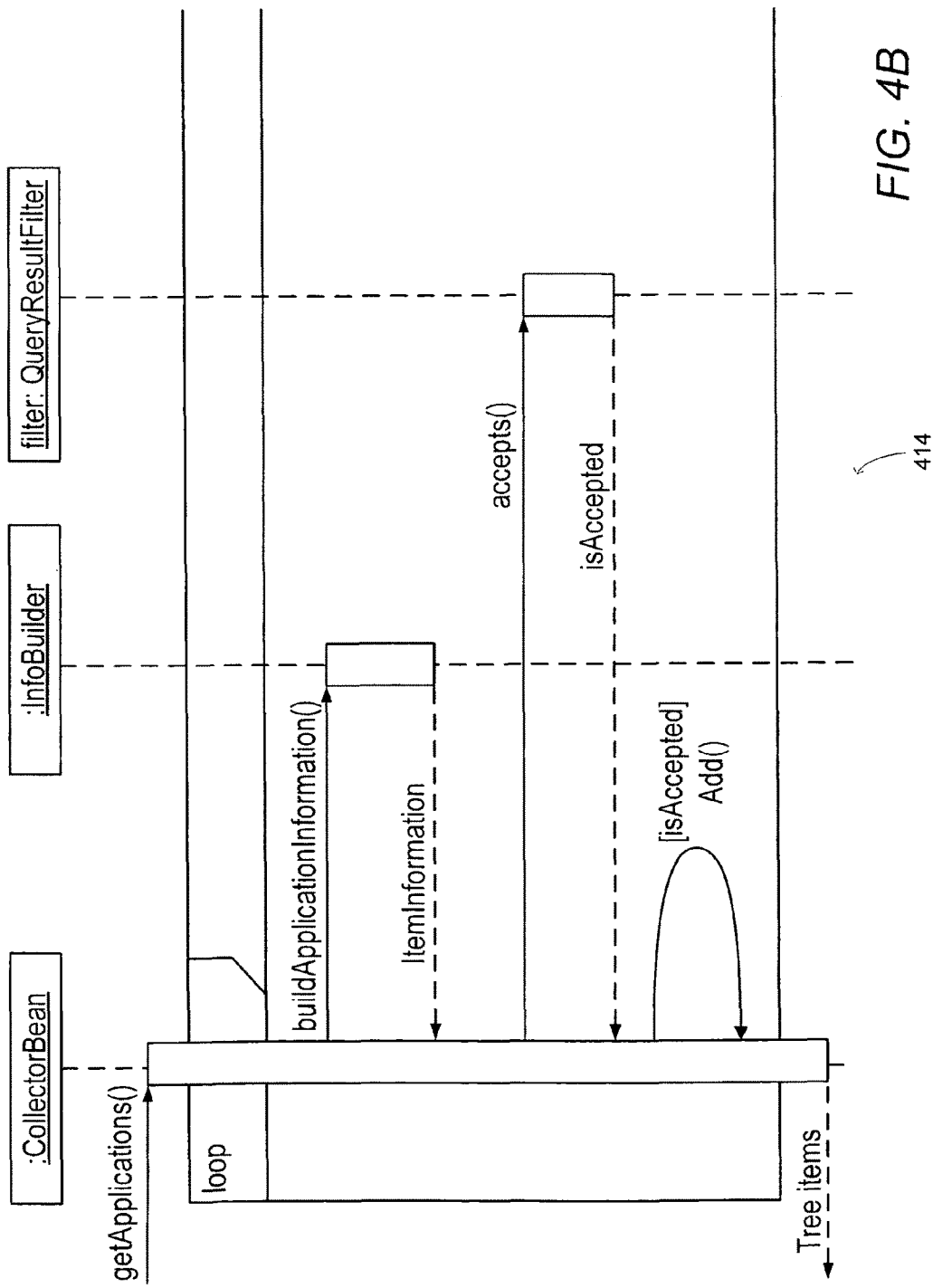

FIG. 4B is a sequence diagram 414 illustrating a collection process 420 for application level data from the application server 100, in an example embodiment. A collector 116, embodied here as a CollectorBean 206, is called upon by a getApplications( ) method call and initiates a query for application server resource data by calling a buildApplicationInformation( ) function. The returned application information is next passed to an accepts( ) function which checks the data against a filter, embodied as the QueryResultFilter 204 object. The QueryResultFilter object 204 is applied to the results of the query and accepts or rejects the queried information conforming to the parameters defined by that particular filter instance. Accepted applications are sent to an add( ) function which stores the data in a memory, embodied in this example as a Tree item, which will later be displayed in the hierarchical view 126.

Invocation of Business Methods with Simple and Complex Arguments

At the lowest level of the hierarchical view the Enterprise JavaBeans explorer application 102 displays information regarding business methods. The detailed display of the business method includes a description of the arguments to the business method and an option to invoke the business method. The process to invoke business methods includes two functions, the first to display arguments to the user and the second to instantiate arguments and pass them to invoked business methods.

The hierarchical view 126 provides information about the simple and complex object arguments the business method takes as input parameters. These simple and complex object arguments may not be fully described by the data extracted from the MBeans 120 to build the hierarchical view 126, potentially lacking data describing attributes types and the values assigned by a constructor. A data collection process, relying upon java reflection, collects data relating to the arguments used in the business methods to complete the hierarchical view of business methods.

From the detailed display of the business method arguments, a user may initialize the simple and complex arguments with custom values. The detailed display also provides a user the ability to invoke the business method with the initialized simple and complex arguments as input parameters and to view any execution results.

Figure 5:
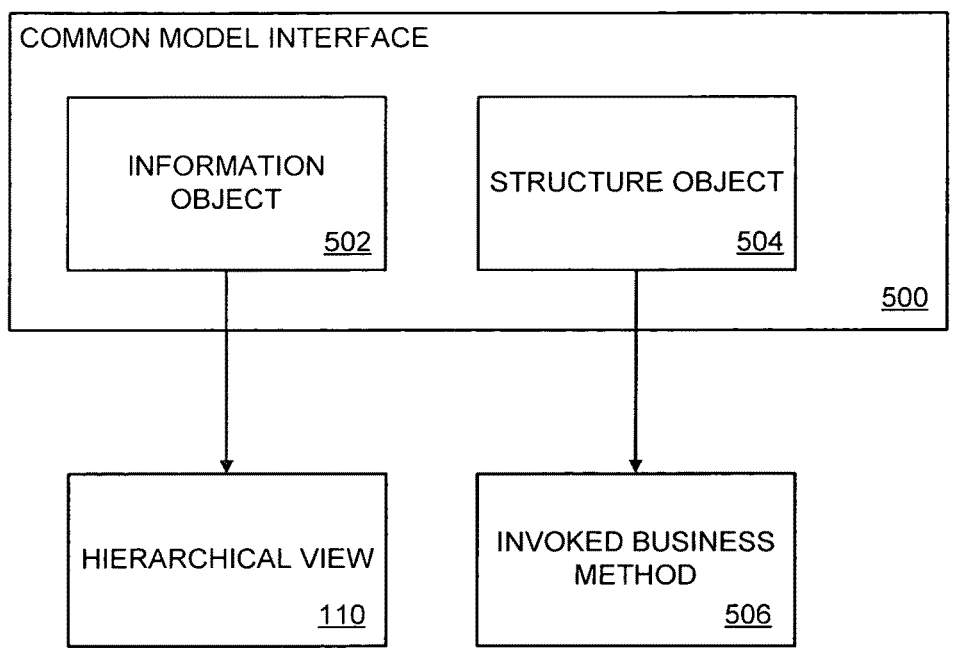
FIG. 5 is an object model a model interface according to an example embodiment.

FIG. 5 is an object model of the structure of a common model interface 500, according to an example embodiment. A common model interface is a data structure used by two disparate platforms to interoperate and transmit information in a shared format. The common model interface 500 is the model for communications between the frontend 110 and backend 108 of the Enterprise JavaBeans explorer application 102 for information relating to the details of business method arguments. In an example embodiment, the common model interface 500 consists of an information object 502 and a structure object 504. The information object 502 describes the object being passed to the business method in terms of attributes, types and other descriptive qualities, as to be utilized by the hierarchical view 126. The structure object 504 is an instantiation of the actual object passed to an invoked business method 506. The information object 502 describes the structure object without the need to know the specific values assigned to the attributes.

Figure 6:
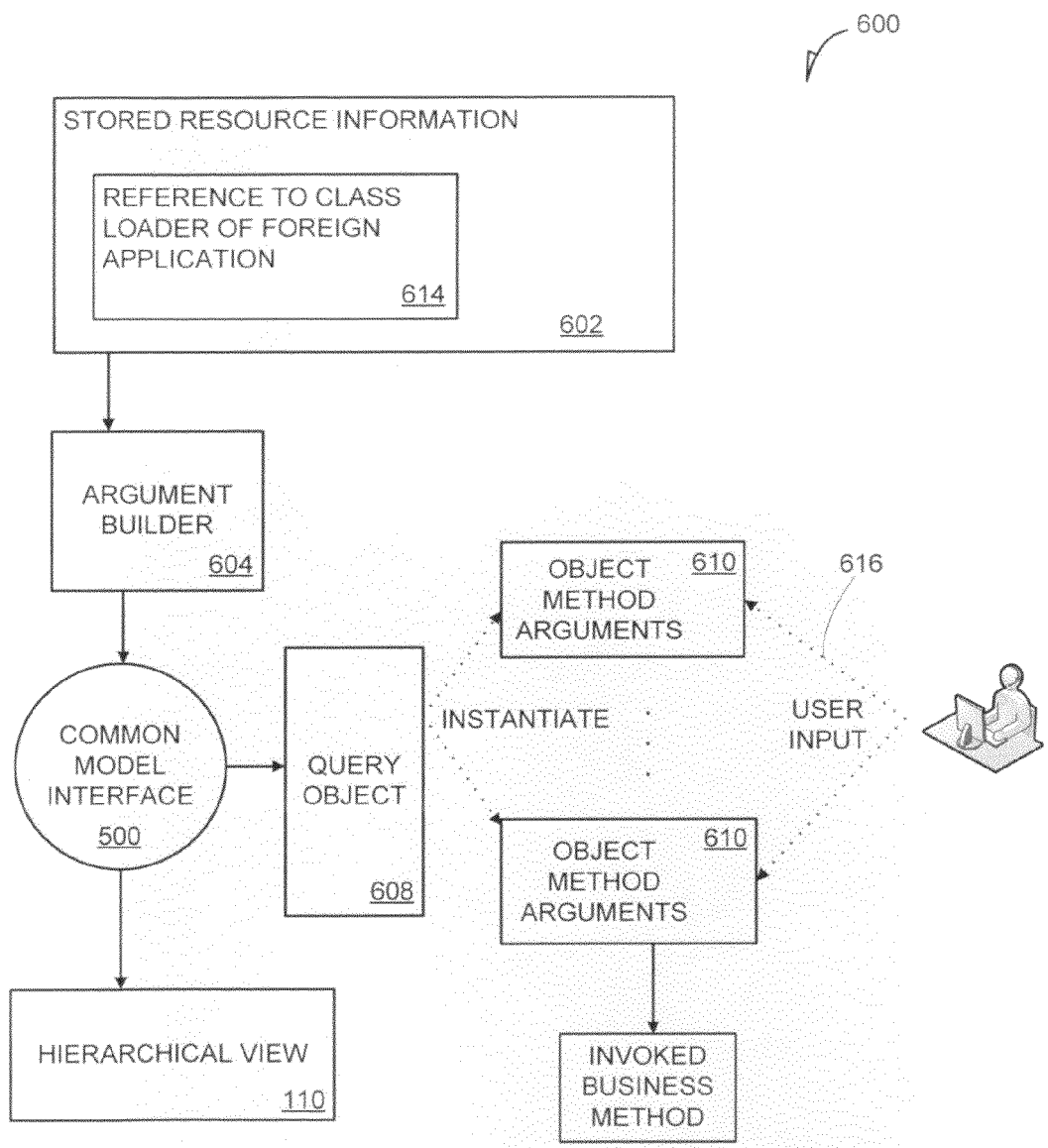
FIG. 6 is a flowchart illustrating the display and creation of complex objects, according to an example embodiment.

FIG. 6 is a flow chart illustrating a method 600 for the display and creation of a complex object 610 to be used as business method arguments, according to an example embodiment. The collector 116 stores collected application server resource landscape data from the MBeans 120 in memory, as represented in a stored resource information object 602. In an example embodiment, an argument building module, such as a method, Enterprise JavaBean or other business logic, referenced herein as an argument builder 604, collects business method argument information for display in the hierarchical view 126. The argument builder 604 accesses the stored resource information object 602 to gather already collected information. If the business methods arguments object types do not exist in the application scope of the Enterprise JavaBeans explorer application 102, the argument builder 604 may access a referenced class loader of the foreign application 614 which can create the object. The argument builder 604 populates the common model interface 500 and the information object 502 with business method argument data collected using java reflection on the instantiated objects created by the before mentioned class loaders and from data in the stored resource information object 602. In one example embodiment, because a business method argument object may contain other objects, the argument builder 604 instantiates business method argument objects in a recursively iterated manner. The frontend 110, in presenting the hierarchical view 126, accesses the common model interface 500 and displays the business method argument information to the user in a detailed display.

An instantiation module, such as a method, module, Enterprise JavaBean or other business logic, referenced herein as a query object 608, instantiates and handles the actual object 610 passed to the business method. The query object 608 instantiates the object method arguments 610, object 610 referenced below, using their associated class loaders. If the instantiated object's class loader is not within the scope of the Enterprise JavaBeans explorer application 102 a class loader reference to the foreign application 614 that does contain the class loaded is accessed to create the object. The query object 608 initializes instantiated objects 610 with information gathered from the stored resource information object 602. In one example embodiment, because a business method argument object may contain other objects, the query object 608 instantiates business method argument objects in a recursively iterated manner. User input 616 may also be entered and used to initialize the attributes of the business method argument objects 610 displayed in the hierarchical view 126.

Figure 7:
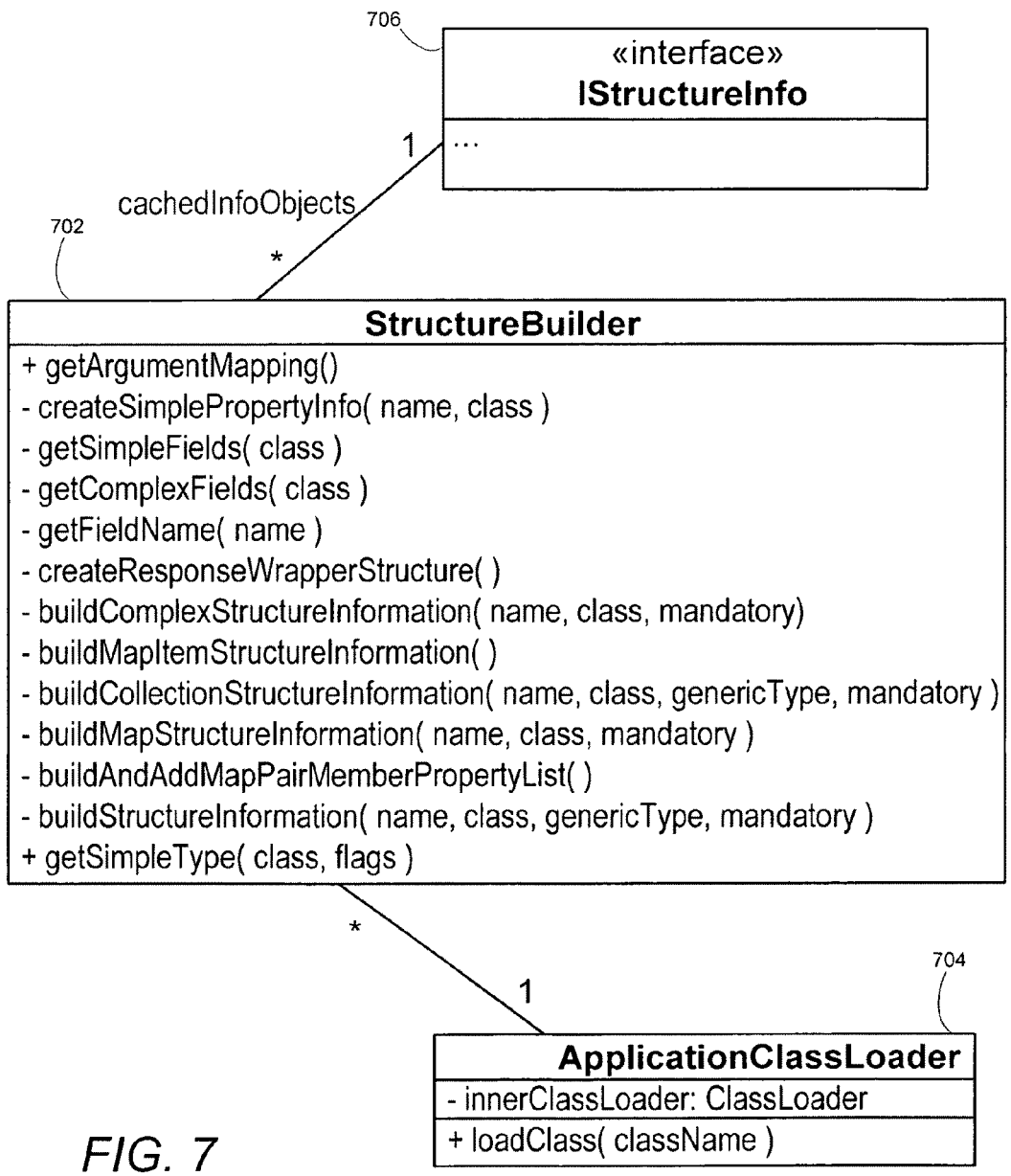
FIG. 7 is a Unified Modeling Language class diagram, showing a structure object, according to an example embodiment.

FIG. 7 is a UML class diagram showing a StructureBuilder object 702. In an example embodiment, the argument builder 604 may be implemented by a StructureBuilder object 702. The StructureBuilder object 702 contains logic to collect, parse and build data to describe business method arguments, including simple and complex objects, such as collections and map structures. The StructureBuilder object 702 maps to an ApplicationClassLoader 704 which is an example embodiment of a reference to a foreign application's class loader 614. Collected business method argument data is stored in the common model interface 500, as embodied in part by the IStructureInfo object 706.

Figure 8:
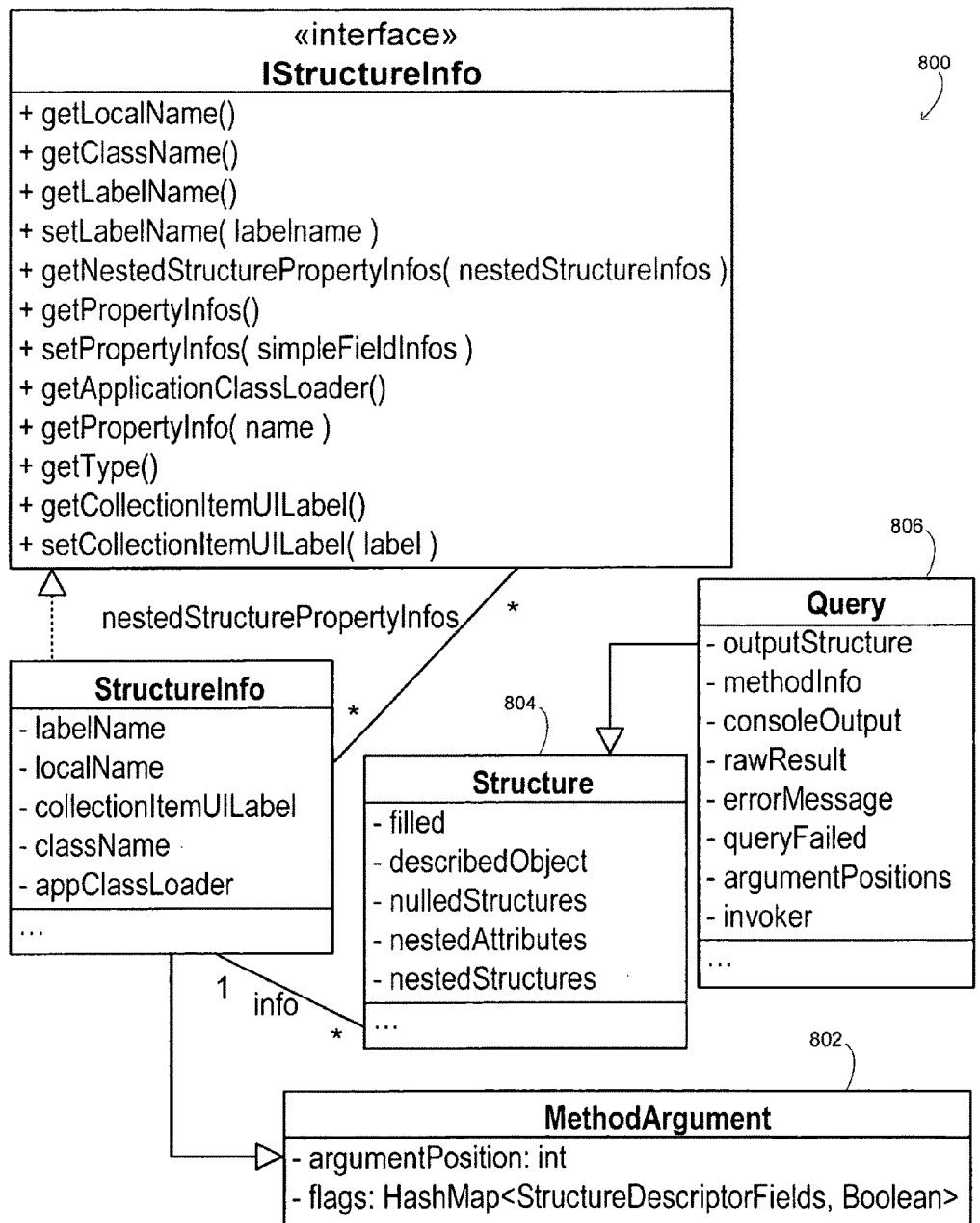
FIG. 8 is a Unified Modeling Language class diagram, showing a model interface, according to an example embodiment.

FIG. 8 is a UML class diagram 800 including the common model interface 500, according to an example embodiment. In this UML structure, objects exist to store data for both attributes and methods. In this example embodiment, a MethodArgument object 802 describes arguments to methods, while a Structure object 804 contains the actual attribute objects. A sample query object 806 embodiment is also disclosed.

Figure 9:
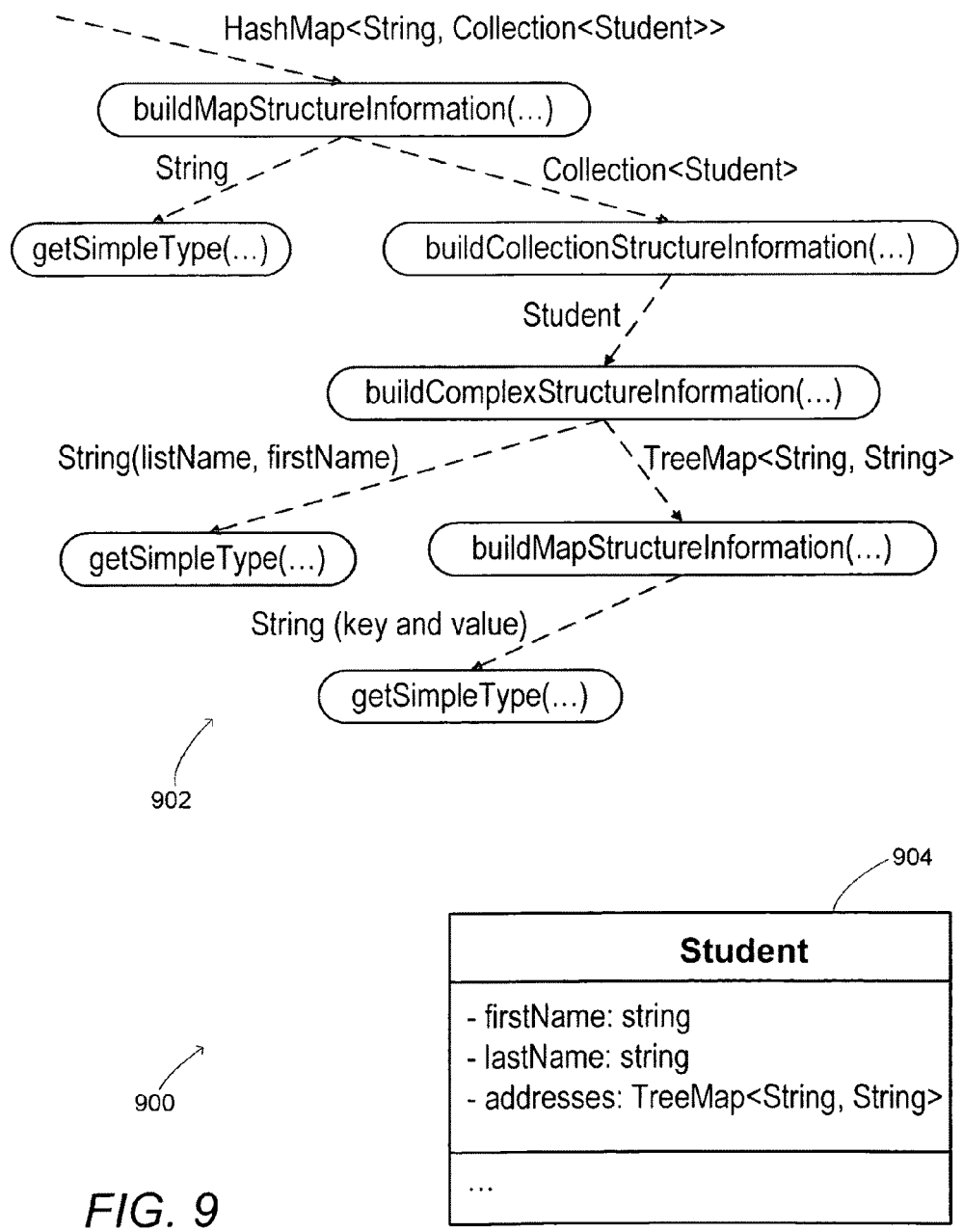
FIG. 9 is a flowchart illustrating an example recursively iterative process to create business method arguments.

FIG. 9 is a flow chart of the process 900 of creating business method arguments in a recursively iterative manner. In FIG. 9, the business method HashMap 902 takes as input two parameters, one String and one collection of object type Student 904. A recursively iterative process fully instantiates the first argument before the second, for every list of objects and levels of a nested object. Hence, of the list of two inputs of business methods HashMap 902, the first input of type String is instantiated before the collection of object type Student 904. A collection of object type Student 904 need instantiate only one Student 904 object. The Student 904 object in FIG. 9 contains two Strings, firstName and lastName, and one TreeMap, with a TreeMap consisting of two strings. According to a recursively iterative manner, the first argument of Student 904 is instantiated before the second, recursively. In this instance, an object of type String is instantiated for firstName and lastName before the TreeMap strings are instantiated. Thus, the recursive order of argument instantiation applies to the order of argument objects for a business method and the attributes, whether nested, complex or simple objects, that are contained within an argument object. In an example embodiment, the recursive object instantiation process caches created objects. As applied to the above example, the first String instantiation and its properties are cached and used to expedite the population of a common model interface 500 and invocation of business methods.

FIG. 10 is a user interface screenshot 1000, showing an example user interface 1000 into which a user can provide data for business methods, according to an example embodiment. The hierarchical view 126 presents a business method and a detailed display of the simple and complex arguments it takes as input parameters. FIG. 10 presents an example of a business method that takes as input complex type SchoolClass, which contains various other objects. If a user does not provide input, values are initialized according to their constructor or left null. However, the hierarchical view allows a user to enter values, such as illustrated by the text box for the String titled Fname. The interface allows nested items to be collapsible.

Figure 11A:
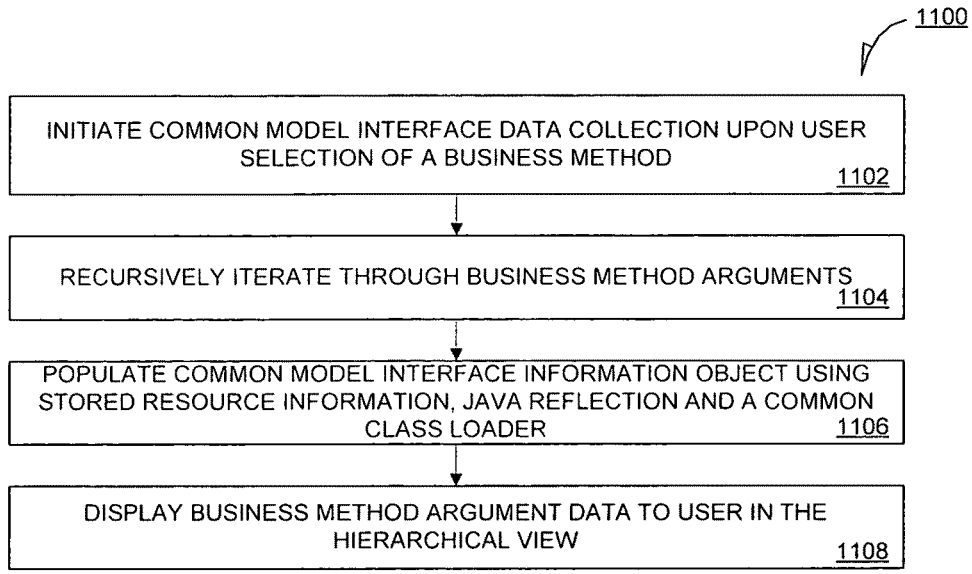
FIG. 11A is a flowchart illustrating a process to display business method arguments, according to an example embodiment.

FIG. 11A is a flowchart of the process 1100 to display business method arguments. At operation 1102, a user initiates the data collection for business method arguments by selecting a business method in the hierarchical view or by refreshing a view when a business method is selected. Business method argument information passed to the hierarchical view 126 is stored in the information object of the common model interface 500. The common model interface 500 is initialized to receive data upon the above described triggering events.

Argument building logic such as an argument builder 604 or a StructureBuilder object 702 prepares the common model interface 500 to store incoming data. At operation 1104, the argument builder 604 collects data for the business method arguments in a recursively iterated manner with the first argument being queried for before the next, recursively, such as illustrated in FIG. 9. As shown at operation 1106, data can be collected either from the stored resource information object 602 in the memory of the Enterprise JavaBeans explorer application 102 or by using java reflection on an instantiated object created by the Enterprise JavaBeans explorer application's class loader or a referenced foreign application class loader 614, objects 614 referenced below. If the business method argument object exists within the class loader scope of the Enterprise JavaBeans explorer application 102, the required data either exists already in the stored resource information object 602 or the object can be created by the Enterprise JavaBeans explorer class loader. If the object does not exist within the scope of the Enterprise JavaBean explorer application class loader, then the object can be instantiated by referencing the class loader of the foreign application 614 that hosts it. This reference is gathered during the collector's query of the MBeans 120. Once the object is instantiated, Java reflection is used to collect information about the object's attributes. This information is stored in the common model interface 500 and is displayed to the user in the hierarchical view 126 at operation 1108.

Figure 11B:
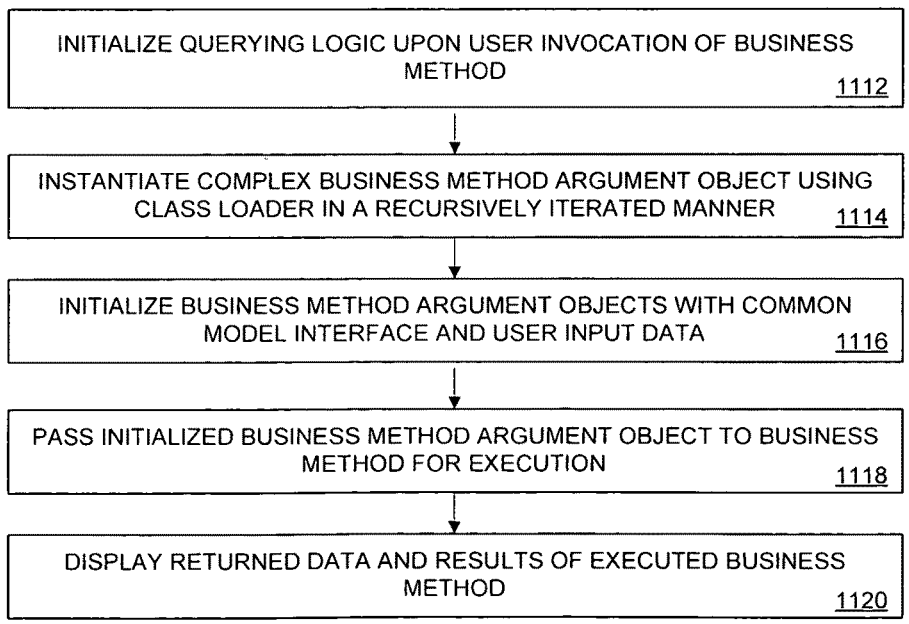
FIG. 11B is a flowchart illustrating a process of business method invocation, according to an example embodiment.

FIG. 11B is a flowchart of the process 1110 of business method invocation. At operation 1112 the process begins when the user invokes a business method from the hierarchical view 126. This action triggers business logic, such as a query object 608, to call the business method. If the business method does not require any input parameters then the flow skips to operation 1120. As operation 1114 describes, if arguments exist they are instantiated using a class loader in a recursively iterated manner as described in FIG. 9 with the first argument being instantiated before the second, recursively. The argument objects 610 are instantiated by class loaders either accessible directly by the Enterprise JavaBeans explorer application 102 or by a class loader from a foreign application 614 that is referenced from data stored in memory and gathered from prior queries to the MBeans 120. Next, at operation 1116 the application will initialize the attributes of the argument object using data stored in the common model interface 500 or with values generated by the default constructor. User input 616, such as inputted and described in FIG. 10, is used to initialize attributes if provided. Common model interface 500 data used to initialize the instantiated object 610 may include default values, preferred values, or prior user generated preferences. At operation 1118, the business method is invoked with the initialized arguments objects 610 as input parameters. In an example embodiment, the Enterprise JavaBeans explorer application 102 may remotely call the business methods or it may invoke a call from an instantiated version of the object 610 that contain the business method. The query object 608 may store information that identifies and describes the Enterprise JavaBean object and identifies the target method to be invoked. Lastly, at operation 1120 the results are returned and displayed to the user. If the return type itself is a complex object, the same process described in FIGS. 11A and 11B is repeated for that newly returned object type, so that the results are displayed to the user in a structured manner with the values contained within the execution results object populating the view of the object presented. For example, if a Student object is returned, then that object is analyzed so that the name of a student "John Smith" is presented to the user in the hierarchical view 126.

In some embodiments, the conversion process from the common model interface 500 data to the actual object instantiation cannot be started, such as when generic data or wildcard or typed variables are used or when the object does not comply with the Java bean specification. In such instances, a null value may be assigned.

Figure 12:
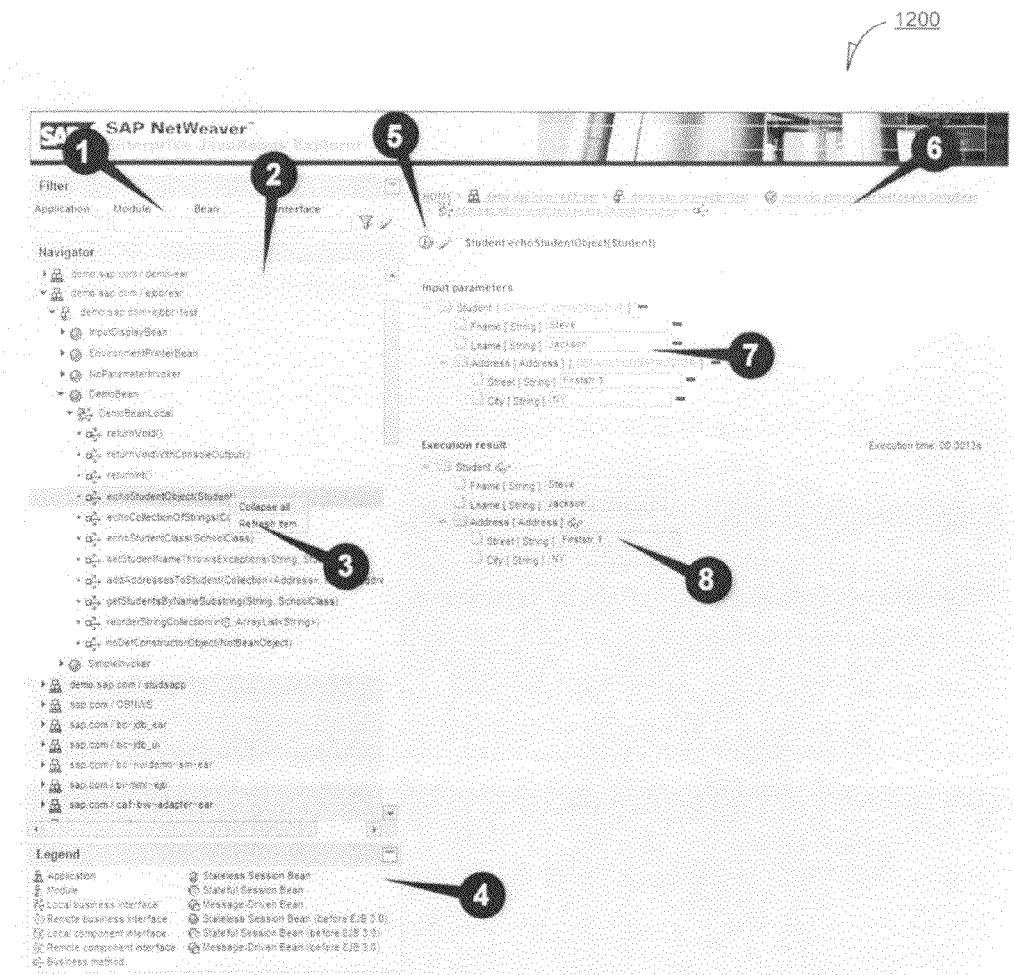
FIG. 12 is an example user interface of an Enterprise JavaBeans explorer.

FIG. 12 is a screen shot showing a user interface 1200 of an Enterprise JavaBeans explorer application 102, in an example embodiment. The user interface 1200 presents a user-friendly design to improve ease of use. In this sample, 1 is a filter for the tree component that allows input of string patterns at the application, module, bean and interface level. A navigator panel 2 provides a hierarchical view of server resources. A context menu 3 presents commands for a particular context within the hierarchical view. A legend for the various objects contained in the navigator panel 2 presents unique icons for each object type. A plurality of buttons 5 initiate the method invocation and reset method invocation parameters. A navigation path 6 represents textually the position within the application server resource landscape and provides the ability to quickly switch between objects in the current path. Input parameters 7 for method arguments allow the user to initialize the object with customized values. Lastly, an execution result panel 8 displays the returned value of the invoked business method.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
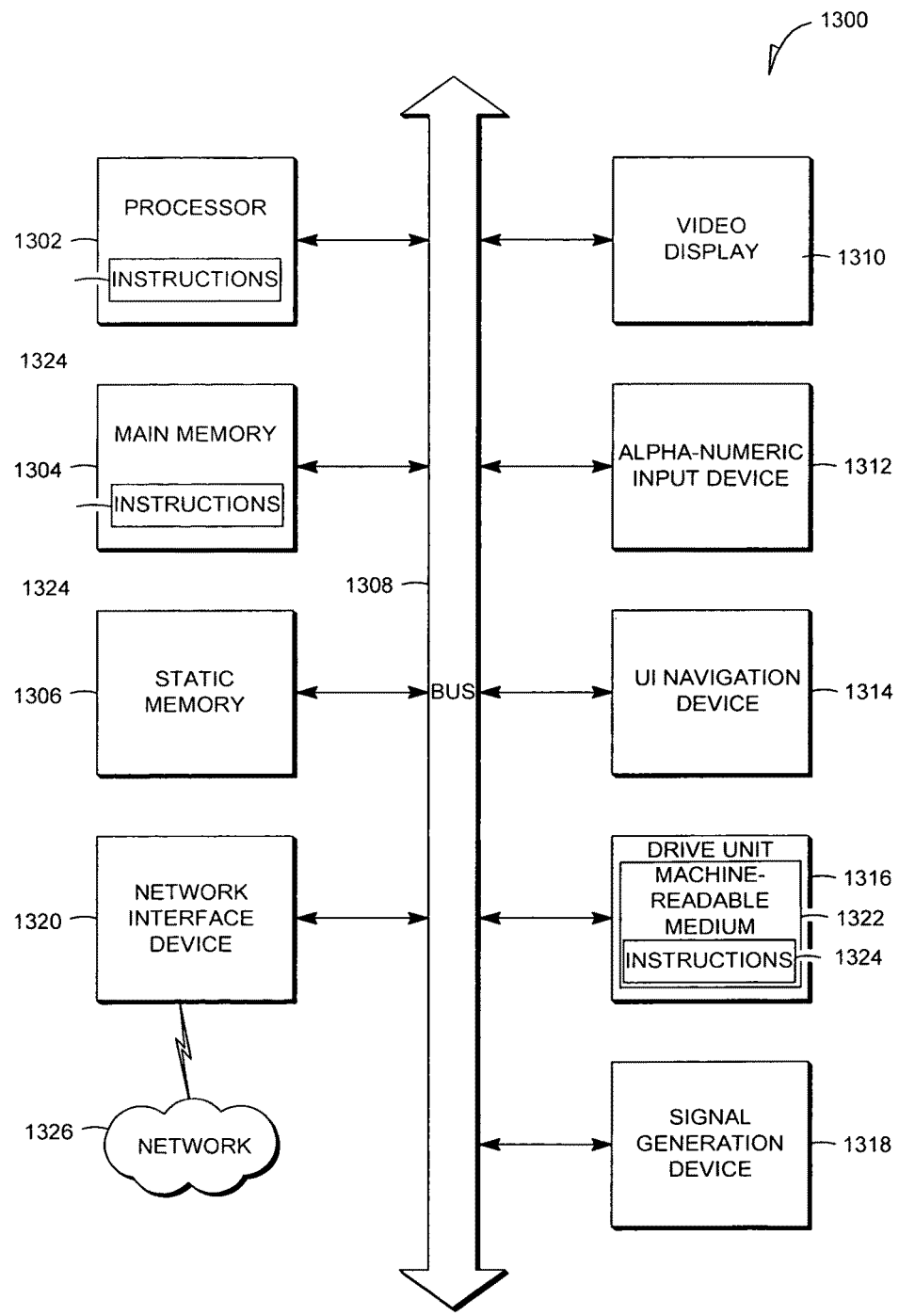
FIG. 13 is a block diagram of a machine in the example form of a computer system within which a set instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   displaying an application server resource landscape in a hierarchical view, the application server resource landscape including an Enterprise JavaBean business method having simple and complex object arguments as input parameters;
   instantiating in a runtime environment a first complex object to be used as an argument for the Enterprise JavaBean business method, the first complex object including at least one runtime component;
   populating the first complex object with test input received from a user via the hierarchical view of the application server resource landscape;
   invoking a test run of the Enterprise JavaBean business method with the first complex object as an argument; and
   displaying results of the invocation of the test run of the Enterprise JavaBean business method in the hierarchical view of the application server resource landscape.

2. The method of claim 1, further comprising gathering information about the application server resource landscape by querying an MBean.

3. The method of claim 1, further comprising using java reflection to gather information about the first complex object.

4. The method of claim 1, further comprising displaying the hierarchical view of the application server resource landscape with collapsible levels including application, module, bean, interface and business method levels.

5. The method of claim 1, further comprising instantiating arguments for the business method in a recursively iterated order.

6. The method of claim 1, further comprising instantiating the first complex object using a class loader of an external application.

7. The method of claim 1, wherein the displaying results includes displaying results of the invocation of the test run of the Enterprise JavaBean) business method in a structured manner with values contained within an execution results object populating a view of the first complex object in the hierarchical view of the application server resource landscape.

8. The method of claim 7, wherein the instantiating includes creating a query object storing information that identifies and describes an Enterprise JavaBean object and identifies the Enterprise JavaBean business method.

9. A system comprising:
   one or more computer processors and storage configured to
   present an application server resource landscape in a hierarchical view, the application server resource landscape including an Enterprise JavaBean business method having simple and complex object arguments as input parameters;
   instantiate in a runtime environment a complex object to be used as an argument for the Enterprise JavaBean business method utilizing one or more processors, the complex argument including at least one runtime component;
   populate the complex object with test input received from a user via the hierarchical view of the application server resource landscape;
   invoke a test run of the Enterprise JavaBean business method with the complex object as an argument; and
   display results of the invocation of the test run of the Enterprise JavaBean business method in the hierarchical view of the application server resource landscape.

10. A system as in claim 9, the one or more computer processors and storage further configured to gather application server resource landscape data by querying an MBean.

11. A system as in claim 9, the one or more computer processors and storage further configured to use java reflection to gather information about the complex object.

12. A system as in claim 9, the one or more computer processors and storage further configured to present the hierarchical view of the application server resource landscape with collapsible levels including application, module, bean, interface and business method levels.

13. A system as in claim 9, the one or more computer processors and storage further configured to instantiate an argument for the business method in a recursively iterated order.

14. A system as in claim 9, the one or more computer processors and storage further configured to instantiate the complex object using a class loader of an external application.

15. A system as in claim 9, wherein the displaying results includes displaying results of the invocation of the test run of the Enterprise JavaBean business method in a structured manner with values contained within an execution results object populating a view of the complex object in the hierarchical view of the application server resource landscape.

16. A system as in claim 15, wherein the instantiating includes creating a query object storing information that identifies and describes an Enterprise JavaBean object and identifies the Enterprise JavaBean business method.

17. One or more machine-readable hardware storage devices comprising instructions, which when implemented by one or more processors perform the operations comprising:
- displaying an application server resource landscape in a hierarchical view, the application server resource landscape including an Enterprise JavaBean business method having simple and complex object arguments as input parameters;
- instantiating in a runtime environment a first complex object to be used as an argument for the Enterprise JavaBean business method, the first complex object including at least one runtime component;
- populating the first complex object with test input received from a user via the hierarchical view of the application server resource landscape;
- invoking a test run of the Enterprise JavaBean business method with the first complex object as an argument; and
- displaying results of the invocation of the test run of the Enterprise JavaBean business method in the hierarchical view of the application server resource landscape.

18. The one or more machine-readable hardware storage devices as in claim 17, further comprising the operation of including receiving data from a user to populate the first complex object.

19. The one or more machine-readable hardware storage devices as in claim 17, further comprising the operation of displaying the execution result of an invoked Enterprise JavaBean business method.

20. The one or more machine-readable hardware storage devices as in claim 17, further comprising the operation of instantiating the first complex object using a class loader of an external application.

* * * * *